United States Patent
Waheed et al.

(10) Patent No.: US 11,711,764 B2
(45) Date of Patent: Jul. 25, 2023

(54) AUTONOMOUS WAKE ON RADIO SCHEDULER THAT SCHEDULES DETERMINISTIC RADIO EVENTS TO REDUCE INVOLVEMENT OF PRIMARY PROCESSOR

(71) Applicant: NXP B.V., Eindhoven (NL)

(72) Inventors: Khurram Waheed, Austin, TX (US); Steven Michael Bosze, Cedar Park, TX (US)

(73) Assignee: NXP B.V., Eindhoven (NL)

( * ) Notice: Subject to any disclaimer, the term of this patent is extended or adjusted under 35 U.S.C. 154(b) by 190 days.

(21) Appl. No.: 17/184,035

(22) Filed: Feb. 24, 2021

(65) Prior Publication Data
US 2022/0272633 A1 Aug. 25, 2022

(51) Int. Cl.
*H04W 52/02* (2009.01)
(52) U.S. Cl.
CPC ............... *H04W 52/0229* (2013.01)
(58) Field of Classification Search
CPC ......... H04W 52/0229; H04W 52/0235; H04W 4/80; Y02D 30/70
See application file for complete search history.

(56) References Cited

U.S. PATENT DOCUMENTS

| | | | |
|---|---|---|---|
| 7,912,442 B2 | 3/2011 | Rotzoll | |
| 8,165,051 B2 | 4/2012 | Aad et al. | |
| 9,049,669 B2 | 6/2015 | Yamamoto et al. | |
| 2009/0046675 A1* | 2/2009 | Pratt, Jr. | ............... H04W 84/18 370/337 |
| 2019/0075520 A1* | 3/2019 | Li | ..................... H04W 52/0216 |
| 2019/0364505 A1 | 11/2019 | Wang et al. | |
| 2021/0152976 A1* | 5/2021 | Daoura | ............. H04W 52/0229 |

FOREIGN PATENT DOCUMENTS

WO WO2018085571 A1 5/2018

* cited by examiner

*Primary Examiner* — Marcos L Torres

(57) ABSTRACT

A wireless communication system including a radio, a processing circuit including a processor and wake on radio circuitry. The wake on radio circuitry uses programmed descriptors to autonomously schedule transitioning into and out of sleep mode to periodically awaken and turn on the radio and perform at least one radio frequency deterministic function while the processor remains in a low power state. The deterministic functions may include a receive function, a transmit function, or a combination of both. The descriptors may be programmed according to any one of different scheduling modes supported by different communication protocols including a timeslot mode and a constant-interval mode. The wake on radio circuitry includes a scheduler that coordinates with protocol circuitry of the radio for performing one or more deterministic functions. The scheduler may program a sleep controller for scheduling sleep modes between communication sessions for performing the deterministic functions.

20 Claims, 8 Drawing Sheets

AUTONOMOUS WAKE ON RADIO SCHEDULER THAT SCHEDULES DETERMINISTIC RADIO EVENTS TO REDUCE INVOLVEMENT OF PRIMARY PROCESSOR

BACKGROUND

Field of the Invention

The present invention relates in general to wireless communication systems, and more particularly to an autonomous wake on radio scheduler that schedules and performs deterministic routine wireless events of a wireless transceiver in a low power manner while reducing involvement of the primary processor.

Description of the Related Art

Conventional radio communication systems include a primary processor or processing circuit or the like. The term "processor" as used herein may include any type of processing device, processing circuit, processing core, central processing unit (CPU), microprocessor, microcontroller or microcontroller unit (MCU), etc. A wireless communication event of a conventional radio communication system typically includes waking up the primary processor from a low power state to enable the processor to prepare the protocol link layer for communication activity by a wireless transceiver. The communication activity may include one or both of a transmit (TX) function and a receive (RX) function according to communication timing parameters. While awake, the processor may perform various tasks such as preprocessing functions including preparing a packet payload for transmission, post processing functions including processing a received packet, along with other functions including but not limited to background or housekeeping tasks.

The primary processor consumes a substantial amount of power while awake. For example, for various Bluetooth® low energy (BLE) advertisement and connection intervals, the primary processor consumes between 30% to 75% of the total power consumed during a communication event between low power states.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
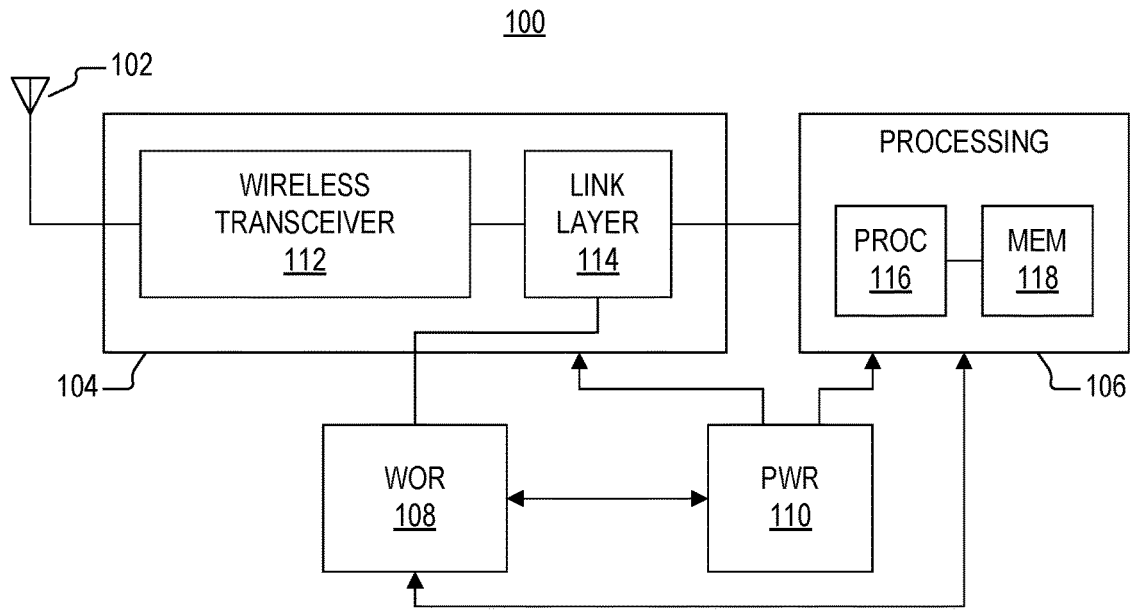
FIG. 1 is a simplified block diagram of a wireless communication system including wake on radio (WOR) circuitry implemented according to one embodiment.

It is recognized that the primary processor may be needed to perform certain tasks, such as radio or protocol initialization, arbitration, packet preparation and processing, data encryption and decryption, etc., as well as making a decision on the next link-layer activity. It is also recognized, however, that there are many deterministic functions in which processor involvement is overhead only and unnecessary. As used herein, deterministic functions are those that are ordinary or routine and often periodic and repetitive and which may be scheduled at constant intervals or on a time-slotted basis. Some examples include periodic channel scanning or non-connectable beacon transmission in Bluetooth®, Bluetooth® low energy (BLE) and ANT/ANT+ (low power wireless communication protocol used for exercise equipment and the like), time-slotted channel hopping transmission of beacons in PANs (Personal Area Networks) according to the Institute of Electrical and Electronics Engineers (IEEE) 802.15.4 standard, waking up for coordinated sampled listening in IEEE 802.15.4 PANs, etc.

An autonomous wake on radio scheduler as described herein is used by a protocol link layer for power-efficient transition into and out of a sleep mode for certain radio or protocol deterministic functions that are periodic or schedulable on a time grid. In various embodiments, the term "sleep mode" as used herein connotes any type of low power mode or state including but not limited to a Deep Sleep Mode (DSM) or a power-down state for the processor platform for maximum power conservation. The wake on radio scheduler provides hardware automation for scheduling activation and deactivation of the radio for sequencing of radio frequency (RF) deterministic functions and operations without processor intervention or involvement. The wake on radio autonomously schedules sleep cycles and performance of the deterministic functions between sleep cycles. The wake on radio scheduler substantially increases the autonomy of the radio transceiver of the radio system while taking advantage of the separated power domains for the processor and the transceiver (analog and digital). The wake on radio provides sufficient hardware automation to enable and ensure long processor low-power intervals while encompassing multiple RF operations whenever possible. In general, the wake on radio scheduler minimizes processor intervention for maximum power savings.

In various embodiments, in addition to providing automation for repetitive, hardware-driven entry into and exit from the sleep mode, the wake on radio scheduler merges and utilizes existing link layer event scheduling engines and may support multiple link layer protocol engines such as, for example, Bluetooth®, BLE, IEEE 802.15.4, as well as other generic protocols to provide support for custom and proprietary protocols such as ANT/ANT+. In one embodiment, two different scheduling modes may be defined including a timeslot mode (for providing capability to schedule multiple radio or link layer events in advance) and a constant-interval mode (for providing fixed-period event scheduling).

FIG. 1 is a simplified block diagram of a wireless communication system 100 including wake on radio (WOR) circuitry 108 implemented according to one embodiment. The wireless communication system 100 includes an antenna 102 coupled to a radio 104, processing circuitry 106, the WOR circuitry 108, and power control (PWR) circuitry 110. The radio 104 is shown in simplified form including a wireless transceiver 112 coupled to link layer circuitry 114. The wireless transceiver 112 includes analog and digital portions, including, for example, antenna matching circuitry, an analog front end, amplifiers, filters, mixers, oscillators, gain control circuitry, an analog to digital converter (ADC), a digital to analog converter (DAC), and other supporting circuitry depending upon the particular configuration and implementation. The link layer circuitry 114 is configured to implement any one or more of many possible wireless protocols. The processing circuitry 106 is also shown in simplified form including a processor 116 coupled to a memory 118. The processor 116 may be implemented in any suitable form, such as a microcontroller or MCU or the like. The memory 118 may include any combination of read-only memory (ROM) or random-access memory (RAM) for storing applications or software and other data and information for use by the processor 116.

The WOR circuitry 108 cooperates with the link layer circuitry 114 for performing certain radio or protocol deterministic tasks that can be either periodic or schedulable on a time grid as further described herein. The PWR circuitry 110 provides power to the radio 104, the processing circuitry 106, and the WOR circuitry 108. The PWR circuitry 110 supports various low power states or sleep modes which may include a deep sleep mode (DSM) for maximum power savings. The radio 104, the processing circuitry 106, and the WOR circuitry 108 are operated in separate power domains in which the processing circuitry 106 may remain in a low power state while the radio 104 and the WOR circuitry 108 are fully powered up for performing deterministic tasks as further described herein. The wireless communication system 100 may be implemented in a discrete manner in which the radio 104, the processing circuitry 106, the WOR circuitry 108, and the PWR circuitry 110 may be implemented on different printed circuit boards or semiconductor chips or integrated circuits (ICs) or the like. The WOR circuitry 108 is shown as a separate block yet may be integrated together with the radio 104. In one embodiment, the wireless communication system 100 may be implemented as a System-On-Chip (SoC) configuration in which the radio 104, the processing system 106, the WOR circuitry 108 and the PWR circuitry 110 are embedded together on a single semiconductor chip or IC. Alternatively, any one or more blocks or circuit elements may be implemented separately or discretely. For example, in an SoC configuration. the processing circuitry 106 may be integrated on the same chip as or may reside fully or partially on a separate device.

In operation, the processing system 106 may generate communication packets (or frames) and cooperate with the link layer circuitry 114 of the radio 104 to wirelessly transmit the communication packets. Wireless packets received by the radio 104 according to the applicable protocol established by the link layer circuitry 114 are provided to the processing circuitry 106 for further processing. As further described herein, the WOR circuitry 108 may awaken at a pre-programmed time or according to a predetermined schedule for performing one or more deterministic tasks using the radio 104 while the processing circuitry 106 remains powered down or in sleep mode. The WOR circuitry 108 communicates with the PWR circuitry 110 to power up the radio 104 while the processing circuitry 106 remains asleep. The WOR circuitry 108 then performs a transmit (TX) operation, a receive (RX) operation, or a combination of both (TX followed by RX or vice-versa) using the radio 104, and then instructs the PWR circuitry 110 to place the radio 104 and the WOR circuitry 108 back into the sleep mode. Depending upon the particular deterministic task being performed, the WOR circuitry 108 may interrupt the processor 116 causing the PWR circuitry 110 to power up the processing system 106.

Figure 2:
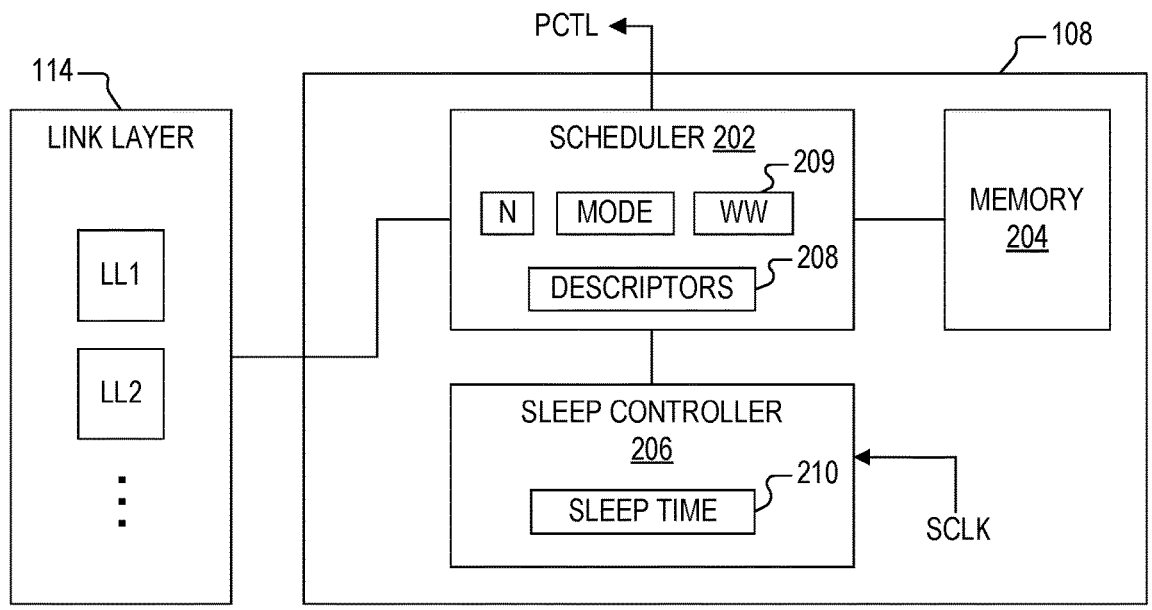
FIG. 2 is a simplified block diagram of the WOR circuitry of FIG. 1 implemented according to one embodiment coupled to the link layer circuitry.

FIG. 2 is a simplified block diagram of the WOR circuitry 108 implemented according to one embodiment coupled to the link layer circuitry 114. The link layer circuitry 114 may incorporate one or more separate link layer (LL) engines LL1, LL2, etc. Each LL engine is configured to operate the wireless transceiver 112 according to a corresponding protocol, such as Bluetooth®, BLE, IEEE 802.15.4 (PANs), Zigbee, Z-wave, ANT/ANT+, etc. Generally, only one of the LL engines is enabled or active at a time for a given configuration of the wireless communication system 100. The WOR circuitry 108 includes a scheduler 202 coupled to a memory 204 and a sleep controller 206. The scheduler 202 may provide one or more power control (PCTL) signals to the PWR circuitry 110 for controlling the power state of the radio 104. The WOR circuitry 108 may also be separately coupled to the processing circuitry 106 for interrupting the processor 116 when instructed or upon any error conditions.

The scheduler 202 cooperates with the enabled or selected LL engine of the link layer circuitry 114 for performing a scheduled operation using the radio 104. The scheduler 202 incorporates or otherwise accesses a set of descriptors 208 that are programmed with timing and other parameters for controlling the scheduled operation. Two other parameters include an integer value "N" identifying the number of applicable slots in the descriptors 208 and a MODE value indicating the mode of operation other than sleep mode. The scheduler 202 may further include window widening (WW) circuitry 209 for adjusting timing during receive operations as further described herein. The memory 204 may include any combination of RAM and ROM devices for enabling operation by the scheduler 202. The memory 204 may store applications or software executed by the scheduler 202 during operation. In addition, the memory 204 may include a packet buffer or the like (not shown) for storing one or more packets for transmission or for storing received packets. The sleep controller 206 includes or accesses a programmable memory or register or the like that stores a sleep time value 210 programmed by the scheduler 202 for waking up the system after a determined time interval as further described herein.

In general, the WOR circuitry 108 is used by the applicable LL engine for power-efficient transition into and out of the sleep state for certain radio or protocol tasks that can be either periodic or schedulable on a time grid. The WOR circuitry 108 provides hardware automation to place the radio 104 into sleep mode, to awaken the radio 104 when desired to perform one or more functions (or sequences or operations), to control the sequencing of radio frequency (RF) functions between sleep cycles without intervention by the processing circuitry 106. The WOR circuitry 108 provides automation for repetitive, hardware-driven sleep entry/exit, merges and utilizes existing LL engine event scheduling, minimizes processing circuitry 106 intervention to achieve maximum power savings taking advantage of separate power domains thereof, supports multiple LL engines and corresponding communication protocols, and schedules TX, RX, TX/RX functions as further described herein.

For successful communication between two wireless peer devices, the receiving device needs to be ready to receive when a packet is transmitted over the air. While in cellular and other infrastructure deployments that can provide a global time reference, this time synchronization can be globally derived by all participating nodes independently using the available global time reference. In low-power ad-hoc networks, low duty-cycle peer-to-peer, star or mesh connections, etc., however, the communication devices should track any timing drift between them to ensure that the corresponding transmission and reception have a valid overlap. Because a device in a connected state is not receiving all the time, its timebase invariably drifts with respect to the timebase of other device(s) in the network, due to finite crystal oscillator tolerance and varying ambient and aging conditions amongst the networked devices. It is noted that timing drift may become excessive if allowed to accumulate. Reducing the duty cycle of the receiver, albeit desired to achieve power savings, exacerbates the drift problem. The WW circuitry 209 may be configured to auto-estimate the drift for the constant interval mode as well as capture time-stamps that allows for the drift computation to be carried out (using processor resources) in time-slotted (or unequal interval) modes.

In various circumstances a receiving device is expecting to receive a packet within a certain window or at a certain time, but, because of limited sleep clock accuracy and timing drift caused by temperature, usage, aging, etc., there is an uncertainty as to the exact timing of this communication window at the sending device. The recipient may therefore adjust its listening time to allow for this uncertainty. The increase in listening time is referred to herein as window widening. Window widening may take into account sleep clock accuracy (SCA) of both the transmitting device and the receiving device. In illustrated embodiments, the WW circuitry 209 provides and updates a window widening adjust (WWA) value during receive operations. In one embodiment, the recipient may start listening at a time before a specified start time and stay on for a time after a specified end time. The WWA value determines a time used before and after a specified communication window. If the recipient has more accurate information about the clock of the transmitting device, it may adjust (e.g., reduce) the WWA value. In various embodiments, however, it may be difficult to accurately determine drift changes under different operating conditions. The WWA value, therefore, may be determined based on worst-case scenarios.

As time elapses in a network connection between successful packet receptions, the WW circuitry 209 performs a window-widening algorithm that generates and updates the WWA value to allow the transmitted packet to fall within the receiver's window in the presence of a drifting timebase. In one embodiment, the WWA value is incrementally increased over time. As the WWA value is incrementally increased, it gradually moves future receiver turn-on times to advance window timing and to retard the turn-off time. The WWA value may be reset or set back to zero in response to system reset or by the processor 116. The WWA value may be adjusted on the successful reception of a good packet (CRC verified and passing of packet filtering) as the actual WWA value becomes precisely known. In one embodiment, window widening is applicable only to the slave device(s) in a network, as the master or coordinator of the network may be in control of network timing. Thus, the WW circuitry 209 may be enabled or disabled for a given network configuration. In one embodiment, the window widening algorithm performed by the WW circuitry 209 takes into account the SCA values of the devices in the network. SCA is a BLE concept, yet such BLE nomenclature may be adopted and extrapolated to the supported protocols.

Figure 3:
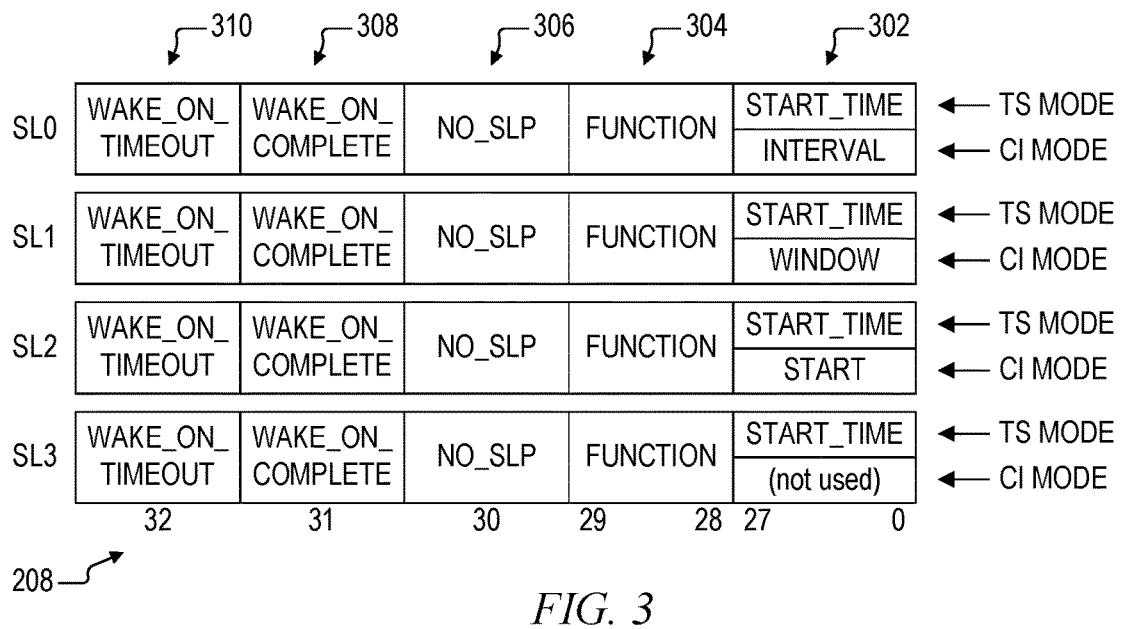
FIG. 3 is a block diagram of the descriptors of FIG. 2 according to one embodiment.

FIG. 3 is a block diagram of the descriptors 208 according to one embodiment. The descriptors 208 may be implemented as programmable registers or the like incorporated within, or otherwise accessible by, the WOR circuitry 108. The descriptors 208 may be configured to support multiple types of scheduling modes supported by multiple different protocols. The illustrated descriptors 208 are configured to support two different scheduling modes including the timeslot mode and the constant-interval mode as indicated by the MODE value. These two modes are deemed adequate to meet the requirements for narrowband communication in both 2.4 gigahertz (GHz) and 900 Megahertz (MHz) industrial, scientific and medical (ISM) radio band operations. In different embodiments, any suitable number of descriptors may be defined for supporting any number of different radio bands that may be used by the wireless communication system 100. The illustrated descriptors 208 include four different slots SL0, SL1, SL2, and SL3 (SL0-SL3). In different embodiments, it is appreciated that any number of slots or descriptors may be included more or less than four.

In timeslot mode, time is divided into multiple slot-frames of fixed duration in which each slot-frame contains a programmable number of slots. Once a timeslot operation is established, slot-frames may repeat back-to-back as long as desired. Wireless devices in a given wireless network can be assigned to 1 or more slots within a slot-frame. For any given device in any given slot, the assigned slot can be TX, RX, TR, or RT. As an example, a first device can be assigned to TX in a given slot whereas another device can be assigned to RX in the same slot to create a link between the 2 devices. Links can be dedicated (one TX and one RX device assigned), or links can be shared (multiple TX devices and multiple RX devices, such as using carrier-sense multiple access (CSMA) or the like). Each slot may use the same or a different hop frequency.

Each of the slots SL0-SL3 includes a time field 302, a function field 304, a sleep field 306, a complete field 308, and a timeout field 310. The time field 302 is a dual-purpose field that stores either a START_TIME value in each slot for the timeslot mode (shown as TS MODE) or INTERVAL, WINDOW, and START values in slots SL0, SL1, and SL2, respectively, for the constant-interval mode (shown as CI MODE). The time field 302 is not used in slot SL3 for the constant-interval mode in the illustrated embodiment. The time field 302 is shown including 28 bits (27:0) defining a number of incremental time units for defining a duration in time. In one embodiment, the time units are in microseconds (µs). The function field 304 identifies the FUNCTION or sequence to be performed by the WOR circuitry 108 and the radio 104. Although any number of functions may be defined in different embodiments, in the illustrated embodiment the function field 304 includes 2 bits (29:28) for defining up to 4 different functions including, for example, TX, RX, TR (TX followed by RX), and RT (RX followed by TX). Other radio functions and composite function sequences may be supported by a WOR engine as may be needed for an implementation. The sleep field 306 includes a single bit (30) storing a value NO_SLP identifying whether or not to enter sleep mode after the function is completed or after timeout. If not set (e.g., when NO_SLP is logic 0), then operation enters sleep mode, and if set (e.g., when NO_SLP is logic 1), then operation proceeds to the next time slot without entering the sleep mode. The complete field 308 includes a single bit (31) storing a WAKE_ON_COMPLETE value that determines whether or not to interrupt the processor 116 of the processing circuitry 106 upon completion of the corresponding function, such as after transmitting a packet or after successfully receiving a good packet. The timeout field 310 includes a single bit (32) storing a WAKE_ON_TIMEOUT value that determines whether to interrupt the processor 116 upon a timeout condition during an RX function.

Figure 4:
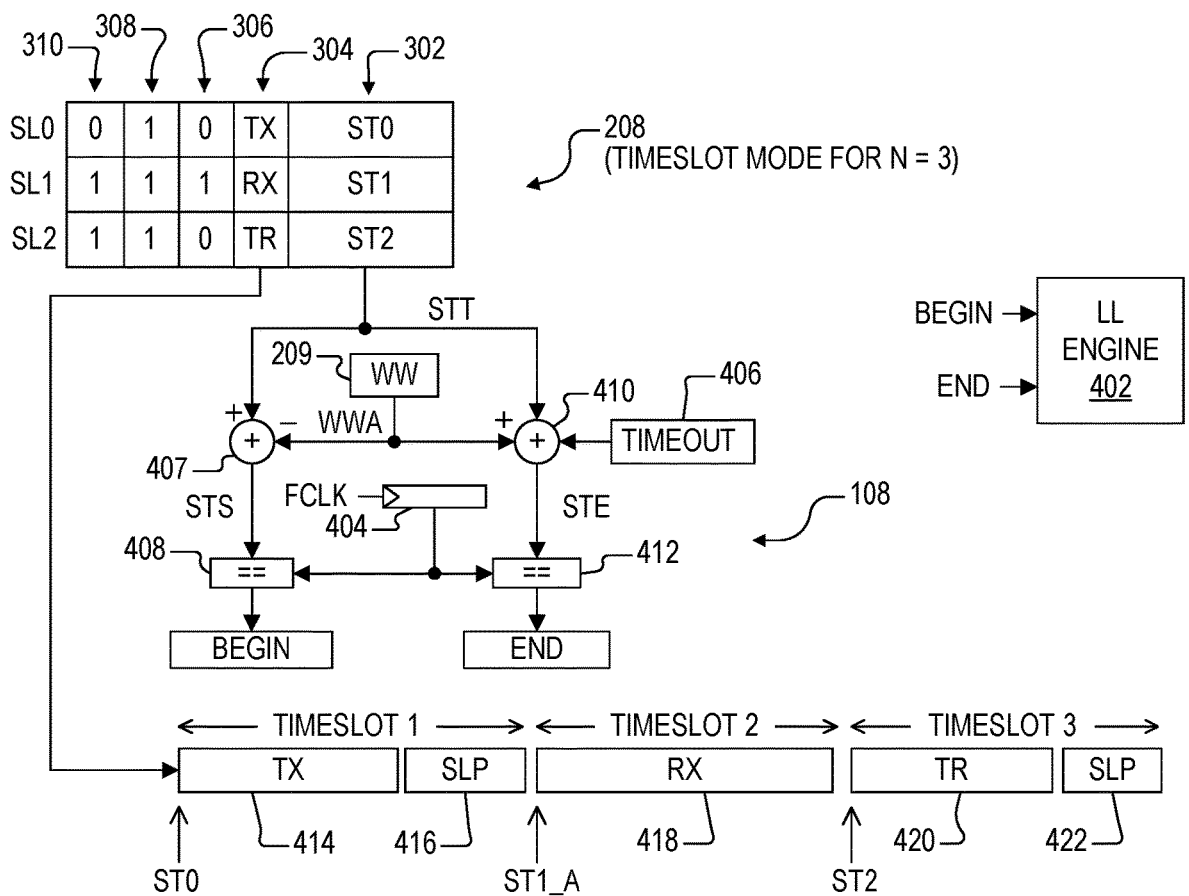
FIG. 4 is a figurative schematic and block diagram of the descriptors of FIG. 2 with programmed values and portions of the scheduler and the link layer logic illustrating operation of the WOR circuitry of FIG. 1 in a timeslot mode of operation.

FIG. 4 is a figurative schematic and block diagram of the descriptors 208 with programmed values and portions of the scheduler 202 and the link layer logic 114 illustrating operation of the WOR circuitry 108 in the timeslot mode. A memory or register or the like (not shown) may be used to program a value "N" which is the number of slots to be used for each slot-frame. When operating in the timeslot mode, the start times for the next N operations are programmed by the processor 116 as START_TIME values into respective time fields 302 of the selected number of slots. In one embodiment, N can be any integer from 2 to 4 for a configuration with a total number of 4 slots, although it is appreciated that N may be less than 2 or more than 4 in different embodiments. In FIG. 4, N=3 and the START_TIME values are shown as ST0, ST1 and ST2 for slots SL0, SL1 and SL2, respectively, in which the fourth slot SL3 is not used for N=3. In one embodiment, the START_TIME values programmed into the time fields 302 of the descriptors 208 are relative to an event timer of the assigned or operative LL engine of the LL circuitry 114, shown as an LL engine 402. In one embodiment, each of the LL engines of the link layer circuitry 114 has a corresponding event timer. The LL engine 402 includes an event timer 404 clocked by a fast clock signal FCLK, in which FCLK may be a high speed clock used by the WOR circuitry 108 during the normal mode of operation. In one embodiment, for example, FCLK has a frequency of approximately 1 MHz, although any other suitable clock frequency may be used.

Upon initialization or between consecutive slot-frames during timeslot operation, the WOR circuitry 108 is disabled or in wait mode while the processor 116 programs the descriptors 208 and other operating parameters, such as N and MODE. The processor 116 identifies the time duration from the current time of the event timer 404 to the next set of N events to be programmed. The processor 116 reads the current value of the event timer 404, adds this value to the time durations to each of the next set of events, and writes the sums as the respective START_TIME values in the time fields 302 of the descriptors 208, shown as ST0, ST1, and ST3 for N=3. The processor 116 also indicates the desired RF function for each slot, in which the scheduler 202 programs the corresponding function fields 304 of the descriptors 208, shown as TX in slot SL0, RX in slot SL1, and TR in slot SL2. The processor 116 also programs the values (or bits) in the sleep field 306 of each of the slots to determine whether to enter sleep mode after the current function is completed and before starting the next slot. The processor 116 also programs the values (or bits) in the complete field 308 of each of the slots to determine whether to interrupt (or awaken) the processor 116 upon completion of the slot function. The processor 116 also programs the values (or bits) in the timeout field 310 of each of the slots to determine whether to interrupt or awaken the processor 116 upon a timeout condition during an RX function. The scheduler 202 includes, or otherwise programs, a timeout register 406 with a TIMEOUT value in the applicable time units (e.g., microseconds) for determining a duration for the timeout condition.

The scheduler 408 selects the next START_TIME value from the time field 302 of the descriptors 208, which is the first or next one of the start time values ST0-ST2, and provides a selected start time STT to an input of an adder 407. The adder 407 subtracts the WWA value provided by the WW circuitry 209 from STT to provide an adjusted start time STS, which is provided to an input of a comparator 408. Although not explicitly shown, in one embodiment, the WWA value is only updated during RX functions. The comparator 408 compares STS with the current time value of the event timer 404 of the LL engine 402. When STS matches the event timer value, the comparator 408 asserts a BEGIN command to the LL engine 402 to initiate the next function in the next time slot of the slot frame. The scheduler 202 also includes an adder 410 and another comparator 412. The adder 410 adds STT to the TIMEOUT value and to the WWA value and provides an adjusted end time STE to an input of the comparator 412. The comparator 412 compares STE to the event timer value and when STE matches the event timer value, the comparator 412 provides an END command to the LL engine 402 to handle the timeout condition.

Once the descriptors 208 and other parameters are programmed for the next slot frame, the processor 116 enables the WOR circuitry 108 and the scheduler 202 uses the ST0 value and the current value in the event timer 404 to calculate a sleep duration before waking to begin the next slot frame. The scheduler 202 uses the sleep duration to program the sleep time value 210 of the sleep controller 206, and then turns off the radio 104 (if on) puts the WOR circuitry 108 to sleep. The sleep controller 206 remains awake and operative during sleep mode in order to wake up the remaining circuitry to perform the next operation. In one embodiment, the sleep controller 206 operates using a slow clock signal SCLK to minimize power usage during sleep mode. In a more specific embodiment, for example, SCLK has a frequency of approximately 32 to 33 Kilohertz (kHz) to consume substantially less power than FCLK operating at a significantly higher frequency. When the sleep time times out as further described herein, the sleep controller 206 awakens the scheduler 202. It is noted that since the sleep controller 206 operates at a significantly slower clock signal, it awakens the scheduler 202 based on a coarse time frame. As further described below, the scheduler 202 includes timing circuitry operating with a fine time frame so that it may keep the scheduler 202 asleep for a short remaining amount of time before fully awakening the scheduler 202.

In operation, the sleep controller 206 awakens the scheduler 202 prior to the first or next timeslot, shown as TIMESLOT 1, and the scheduler 202 consults the descriptors 208 for controlling operation for each of the programmed slots. The scheduler 202 accesses the first slot SL0 and applies the first time value ST0 to the comparator 408, which compares ST0 with the current time value of the event timer 404 of the LL engine 402. When ST0 matches the event timer value, the comparator 408 asserts the BEGIN command to the LL engine 402 to initiate the first function for slot SL0. As shown, the corresponding RF function is TX so that the LL engine 402 initiates a TX function 414 in TIMESLOT 1 beginning at time ST0. The TX function continues until it either self-terminates or a timeout is reached. In one embodiment, timeout is not relevant to TX functions since these usually self-terminate during normal operation. When the TX function 414 completes during TIMESLOT 1, the scheduler 202 detects completion and consults the values in the sleep field 306 and the complete field 308 to determine appropriate action. Since the sleep value in the sleep field 306 is a logic 0, the scheduler 202 programs the sleep controller 206 with a sleep time value 210 indicative of the remaining duration of TIMESLOT 1.

Typically, for TX functions, it is desirable to interrupt the processor 116 after each transmission to service a packet buffer (not shown) stored within the memory 118. As shown, the complete field 308 of slot SL0 set to 1 so before entering the sleep mode, the scheduler interrupts the processor 116. If it is required to transmit the same packet repeatedly across multiple slots, such that the packet buffer does not require regular service, then the complete field 308 may be set instead to 0 to avoid waking the processor 116 on any slot. In the time slot scheduling mode, the processor 116 may be awakened at least once every $N^{th}$ slot to refresh the descriptors 208 or perform other radio or clock accuracy calibrations as required by a radio implementation. This periodic wakeup requirement may be enforced by appropriate setting of the complete and timeout fields 308 and 310 of the descriptors 208.

The scheduler 202 then performs a sleep mode 416 in which it places the WOR circuitry 108 to sleep and turns off the radio 104 for the remaining duration of TIMESLOT 1. When the processor 116 is interrupted to service a packet buffer or the like, then the processing circuitry 106 places itself back into the sleep mode after completion. Upon completion of the sleep time period, the sleep controller 206 awakens the scheduler 202 prior to TIMESLOT 2, and the scheduler 202 consults the descriptors 208 to retrieve the values for the next slot SL1. The scheduler 202 accesses the second slot SL1, retrieves the corresponding time value ST1, adjusts ST1 by the WWA value to provide STS to the comparator 408, which compares STS with the current time value of the event timer 404 of the LL engine 402. The corresponding function is RX so that the WWA value is applicable. When STS matches the event timer value, the comparator 408 asserts the BEGIN command to the LL engine 402 to initiate the corresponding RF function for slot SL1. As shown, the corresponding RF function is RX so that the LL engine 402 initiates an RX function 418 in TIMESLOT 2 beginning at time ST1_A in which ST1_A is an adjusted value of ST1. As before, the RX function continues until it either self-terminates or a timeout is reached.

A correctly received packet addressed to the wireless communication system 100 self-terminates the RX function before the timeout is reached. Typically, for RX functions, it is desirable to wake the processor 116 on good packets only. The complete field 308 of the applicable slot descriptor is set to logic 1 to wake the processor 116 to service the received packet. In this case, the sleep field 306 for slot SL1 is logic 1 so that the scheduler 202 does not place the WOR circuitry 108 in sleep mode and does not turn off the radio 104. If a timeout is reached, then the comparator 412 asserts the END command to the LL engine 402 which terminates or aborts the RX function. It is noted that timeout typically applies to RX functions only, in which RX functions may result in no packet being received, a packet being received which is not addressed to the device, or a packet which is received corruptly. Upon the occurrence of any of these scenarios in which a timeout is received, the scheduler 202 terminates the RF function before the end of the current timeslot. Upon timeout or termination, even though the complete field 308 is set to logic 1, the scheduler 202 may or may not interrupt the processor 116 depending upon the particular implementation. For example, the processor 116 may not be awakened upon timeout and RX termination when no packet or a bad or corrupted packet is received.

Since the scheduler 202 is not placed into sleep mode and another slot SL2 is indicated (by N=3), the scheduler 202 accesses the third slot SL2 and applies the corresponding time value ST2 to the comparator 408, which compares ST2 with the current time value of the event timer 404 of the LL engine 402. When ST2 matches the event timer value, the comparator 408 asserts the BEGIN command to the LL engine 402 to initiate the corresponding function for slot SL2. As shown, the corresponding RF function is TR so that the LL engine 402 initiates a TR sequence 420 in a third TIMESLOT 3 beginning at time ST2. Operation is similar, except that for the TR sequence 420 the LL engine 402 performs a TX function followed by a corresponding RX function. The RX function is subject to timeout and window widening adjustment. Upon self-termination or upon timeout, the scheduler 202 interrupts the processor 116 according to the programmed values in the fields 308 and 310, and eventually places the WOR circuitry 108 and the radio 104 into another sleep mode 422.

It is noted that if another timeslot had followed TIMESLOT 3, then the scheduler 202 programs the sleep controller 206 to awaken the scheduler 202 just prior to the next timeslot. In one embodiment, upon completion of the last timeslot of the current slot frame, the scheduler 202 interrupts the processor 116 to determine the appropriate values to program the descriptors 208 for the next slot frame, and then go into disable or wait mode. When the WOR circuitry 108 is re-enabled by the processor 116, the scheduler 202 may then use the newly programmed START_TIME value ST0 in the first slot SL0 to calculate the duration of sleep until the beginning of the first timeslot of the next slot frame. The scheduler 202 then programs the sleep time value 210 of the sleep controller 206 accordingly, and then places the WOR circuitry 108 into sleep mode and turns off the radio 104.

Figure 5:
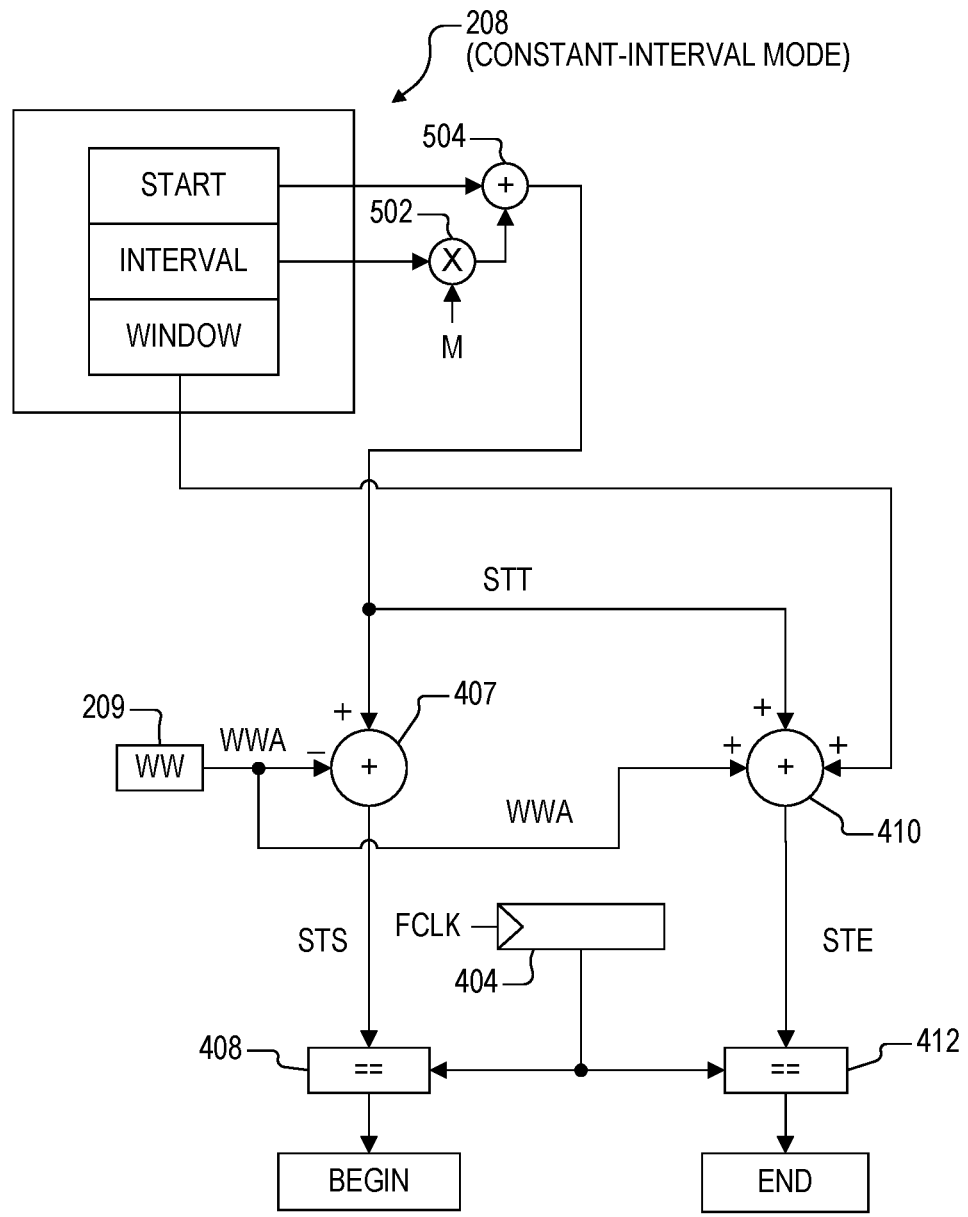
FIG. 5 is a figurative schematic and block diagram of the descriptors with programmed values and portions of the scheduler of FIG. 2 illustrating operation of the WOR circuitry of FIG. 1 in the constant-interval mode of operation.

FIG. 5 is a figurative schematic and block diagram of the descriptors 208 with programmed values and portions of the scheduler 202 illustrating operation of the WOR circuitry 108 in the constant-interval mode. For the constant-interval mode, the time field 310 of the slots SL0, SL1 and SL2 of the descriptors 208 store INTERVAL, WINDOW, and START values, respectively. A multiplier 502 and an adder 504 represent that the INTERVAL value is multiplied by an integer value M and the result is added to the START value to provide the start time STT. M is an integer that starts at 0 and increments with each event window, thus M=0, 1, 2, 3, etc. In a similar manner as described for the timeslot mode, the adder 407 subtracts the WWA value provided by the WW circuitry 209 from STT to provide an adjusted start time STS, which is provided to an input of the comparator 408. As previously described, the WWA value may be updated only during RX functions. The comparator 408 compares STS with the current time value of the event timer 404 of the applicable LL engine. When STS matches the event timer value, the comparator 408 asserts a BEGIN command to initiate the next function in the current event window. The WINDOW value is provided to an input of the adder 410 rather than the TIMEOUT value. The adder 410 adds STT to the WINDOW value and to the WWA value and provides an adjusted end time STE to an input of the comparator 412. The comparator 412 compares STE to the event timer value and when STE matches the event timer value, the comparator 412 provides an END command to the LL engine to complete the window.

Figure 6:
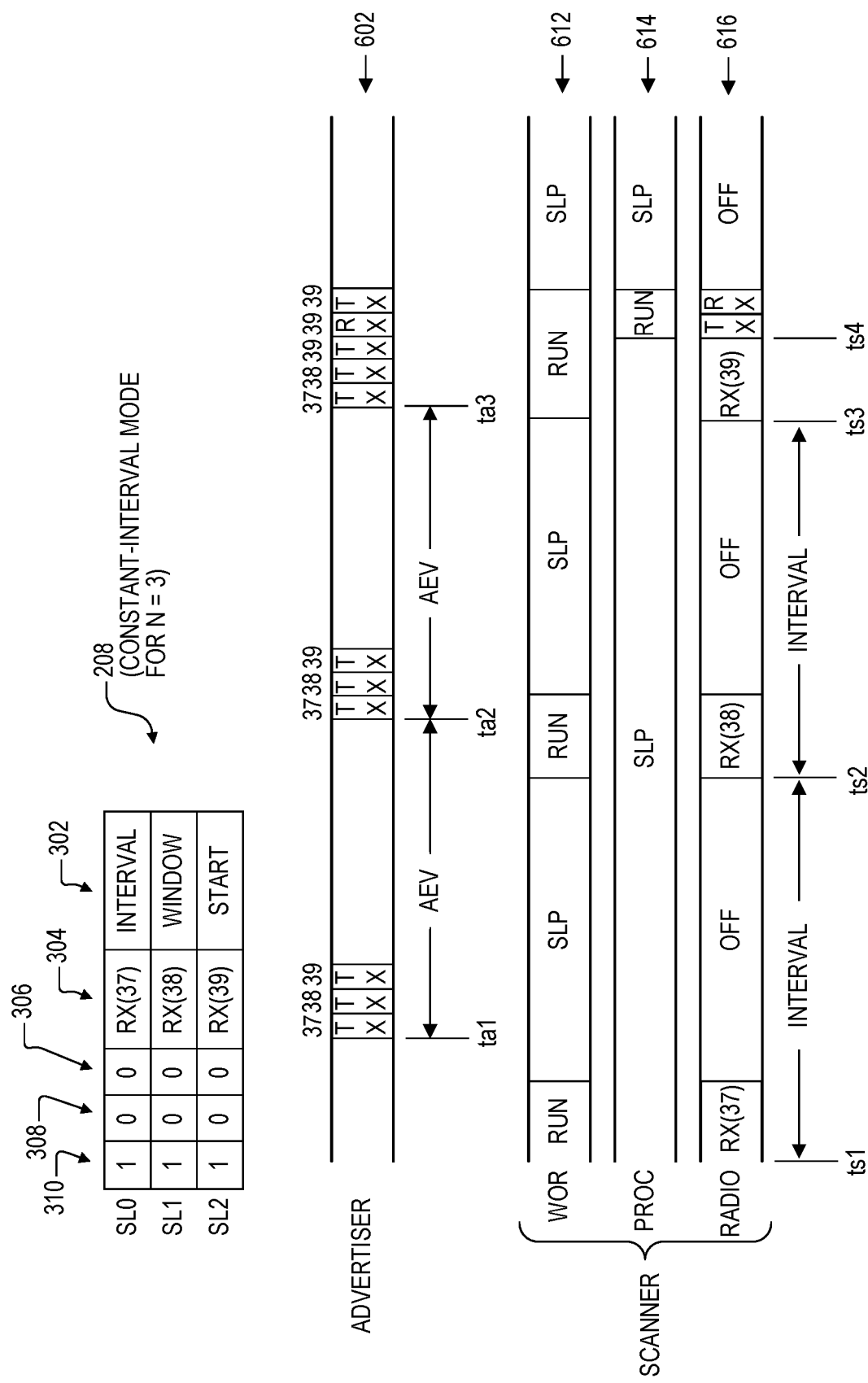
FIG. 6 is a diagram of the descriptors of FIG. 2 programmed for constant-interval mode and a timing diagram illustrating operation of a pair of wireless communication devices illustrating constant-interval mode according to one embodiment.

FIG. 6 is a diagram of the descriptors 208 programmed for constant-interval mode for N=3 and an example timing diagram illustrating operation of a pair of wireless communication devices illustrating constant-interval mode according to one embodiment. A first wireless communication device is an advertiser device that periodically transmits advertising events (or beacons) and a second wireless communication device is a scanner device that scans one or more channels looking for any advertisers for establishing a communication link. The advertiser device is assumed to be a power-unconstrained device having access to power mains or the like. The scanner device, on the other hand, is configured according to wireless communication system 100 operating in constant-interval mode using the illustrated descriptors 208. In one embodiment, the advertiser and scanner devices are configured to operate according to BLE which uses 40 channels in the 2.4 GHz frequency band (e.g., 2,400 to 2,483.5 MHz) including BLE advertising channels 37, 38, and 39.

Operation of the advertiser device is illustrated by a first timeline 602 transmitting advertising beacons or the like in each of the advertising channels 37, 38, and 39 after each advertising event interval AEV. A first advertising event begins at a time ta1 in which the advertiser performs 3 consecutive TX functions in channels 37, 38, and 39 to transmit a beacon or the like in each of these channels. When not transmitting, the advertiser device is assumed to switch to RX mode to listen for any responses in any of the advertising channels by other wireless devices in the wireless network including the scanner device. After interval AEV, the advertiser repeats the TX function at subsequent times ta2, ta3, etc. In this manner, the advertiser device broadcasts beacons in each of the advertiser channels 37-39 once per interval AEV.

Operation of the scanner device is illustrated by a set of 3 timelines 612, 614, and 616 showing operation of WOR circuitry (implemented in a similar manner as the WOR circuitry 108), processing circuitry (implemented in a similar manner as the processing circuitry 106), and a radio (implemented in a similar manner as the radio 104). The scanner device includes the illustrated descriptors 208 programmed for operation in the constant-interval mode for detecting advertising devices such as the advertiser device. As show by the illustrated descriptors 208, the time field 302 of the slots SL0, SL1, and SL2 are programmed with INTERVAL, WINDOW, and START values, respectively, for the scanner device. The START value indicates the starting time of the first event, the INTERVAL value indicates elapsed time between consecutive events, and the WINDOW value indicates the duration of each event. It is noted that a constant interval schedule can potentially run indefinitely unless a timeout or an external processor intervention is made. The first slot SL0 indicates an RX function in channel 37, or RX(37), the second slot SL1 indicates an RX function in channel 38, or RX(38), and the third slot indicates an RX function in channel 39, or RX(39). The sleep mode is indicated after each function is performed within the corresponding event window. The processor 116 is only awakened in the event of timeout, although the radio 104 may separately awaken the processor 116 in the event a beacon is detected.

As shown, the INTERVAL value for the scanner device establishes the event interval between events. The START time may have been set to a first time ts1 beginning a first event in which the WOR circuitry awakens as shown by "RUN" at the beginning of the timeline 612, turns on the radio, and performs the RX(37) function in advertising channel 37 shown at the beginning of the timeline 616. The scanner device performs each function for each event for a duration indicated by the WINDOW value. The processing circuitry including a processor of the scanner device is illustrated by the timeline 614 labeled "PROC" is in a sleep mode SLP and remains in sleep mode until interrupted by the WOR circuitry. The RX(37) function performed by the scanner device beginning at time ts1 is performed to detect any beacons transmitted in channel 37 by advertising devices. Since the RX(37) function occurs before time ta1 while the advertising device is not broadcasting a beacon, the scanner device does not detect the advertiser device during the first event. The WOR circuitry of the scanner device turns off the radio as shown by "OFF" and then places the scanner device into sleep mode SLP.

After the event interval INTERVAL has elapsed from time ts1, the WOR circuitry of the scanner device awakens and turns on the radio to perform the RX(38) function beginning at time ts2 in the next advertising channel 38. Although the RX(38) function overlaps a portion of the TX functions of the advertiser device, the radio of the scanner device receiving in channel 38 misses the beacon being transmitted by the advertiser device in channels 37-39. Thus, the WOR circuitry of the scanner device turns off the radio and then places the scanner device into sleep mode. It is noted that the INTERVAL value for the scanner device should be programmed to establish its event interval different from the advertising event interval AEV since otherwise the devices may not detect each other at all or at least for a significant amount of time. In this manner, INTERVAL is set to be substantially different from AEV (which may be known beforehand) to avoid this situation.

Again, after the event interval INTERVAL has elapsed from time ts2, the WOR circuitry of the scanner device awakens and turns on the radio to perform the RX(39) function beginning at time ts3 in the next advertising channel 39. In this case, the RX(39) function of the scanner device overlaps the TX function of the advertiser device in channel 39, so that the scanner device detects the beacon in channel 39. The scanner device then modifies its operation in the current event window in which the WOR circuitry awakens the processing circuitry as illustrated by "RUN" at subsequent time ts4 in timeline 614. The scanner device performs a TX function while the advertiser device is in RX mode beginning at time ts4 beginning a handshake operation between the devices. The TX function of the scanner device is followed by another RX function at the same time the advertiser device performs another TX function so that the advertiser and scanner devices establish a communication link. Although not specifically shown, the two devices may exchange timing and other information during handshake communications so that they can subsequently communicate with each other over the air in a coordinated fashion.

Although not shown, the scanner device operating in the constant-interval mode may repeat the sequential RX functions RX(37), RX(38), RX(39) indefinitely until a beacon is detected or until the corresponding processor terminates the constant-interval mode. Also, even after detecting a beacon, the scanner device may resume the constant-interval mode for detecting beacons or the like from other devices in the wireless network, or the scanner device might update its WOR descriptors based on exchanged information with the advertiser or decide to change its operational mode to normal radio communication not requiring WOR.

Figure 7:
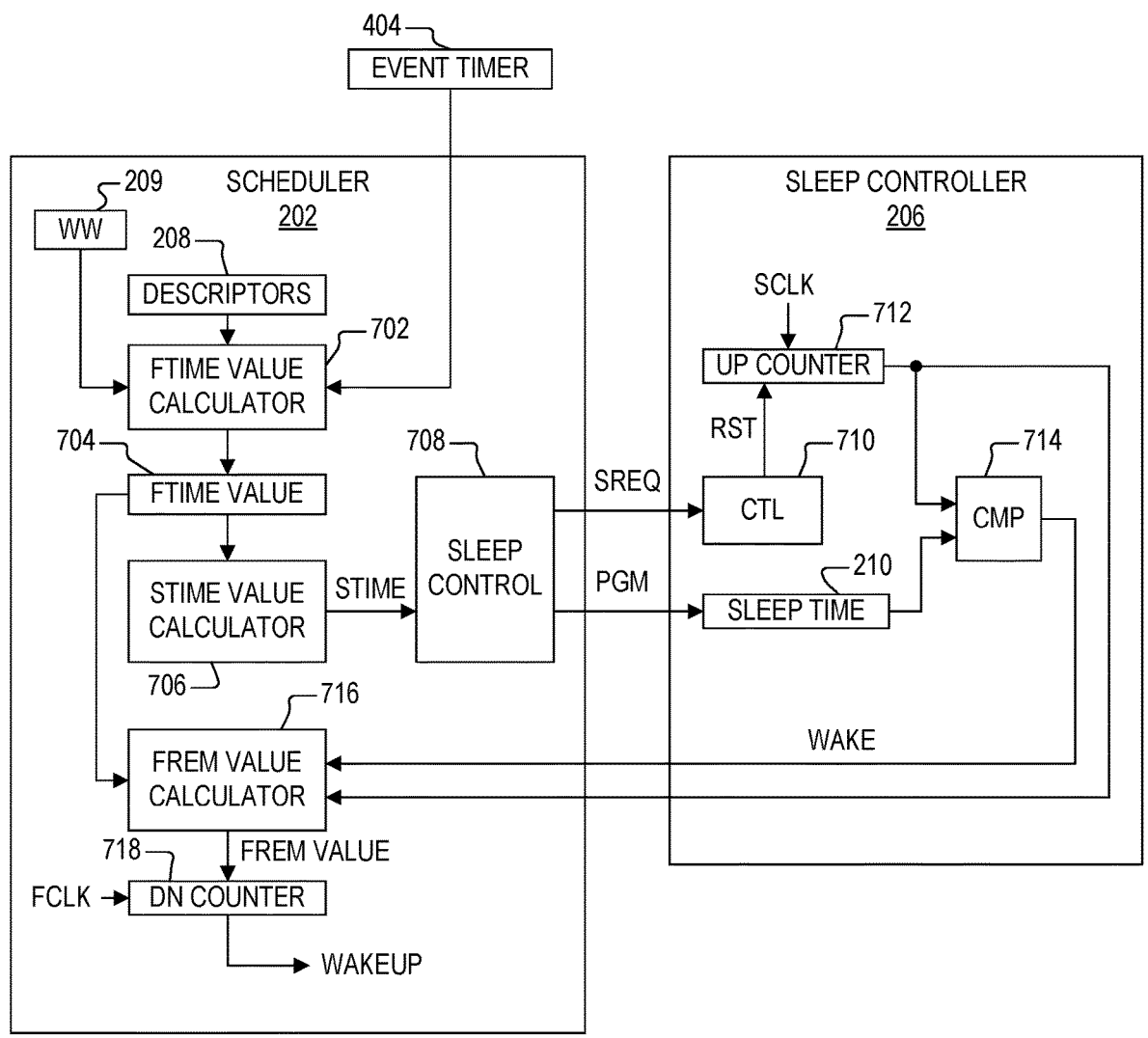
FIG. 7 is a more detailed block diagram of the scheduler and the sleep controller of FIG. 2 illustrating determining and controlling sleep duration according to one embodiment.

FIG. 7 is a more detailed block diagram of the scheduler 202 and the sleep controller 206 illustrating determining and controlling sleep duration according to one embodiment. An FTIME value calculator 702 uses the current time value of the event timer 404, one or more applicable values stored in the descriptors 208, and may consult the WW circuitry 209 to calculate an FTIME value indicative of the sleep duration. In the timeslot mode, the first or next one of the START_TIME values may be used. In the constant-interval mode, the START, INTERVAL, and M values are used for determining a start time of the first event (M=0) or next event. If the WWA value has increased by a sufficient amount and the function is RX, then the sleep duration may be advanced to ensure that the WOR circuitry 108 is awakened in time. The FTIME value 704 is in time units applicable to the FCLK signal. The FTIME value 704 is provided to an STIME value calculator 706 for determining an STIME value used for programming the sleep time value 210 of the sleep controller 206. The STIME value is in time units applicable to the SCLK signal, which has a frequency that is significantly less than the frequency of the FCLK signal. STIME is provided to sleep control circuitry 708 of the scheduler 202, which uses the STIME value to program the SLEEP TIME value 210 of the sleep controller 206. The sleep control circuitry 708 then provides a sleep request (SREQ) signal to prompt control circuitry 710 within the sleep controller 206 to initiate sleep mode. The sleep control circuitry 708 then places the WOR circuitry 108 in the sleep mode.

The sleep controller 206 remains awake during sleep mode and operates using the lower frequency SCLK signal to conserve power and minimize power consumption. In response to receiving the SREQ signal, the control circuitry 710 resets (or otherwise enables) an up counter 712 which receives and is clocked by SCLK. The sleep time value 210 and the count value in the up counter 712 are provided to respect inputs of a comparator 714 within the sleep controller 206. The comparator 714 generates a WAKE signal when the count value 712 reaches the sleep time value 210, in which the WAKE signal is provided to enable an FREM value calculator 716 within the scheduler 202. At this time, only the circuitry of the FREM value calculator 716 is awakened, which uses the FTIME value 704 and the count value of the up counter 712 to calculate an FREM value. The FREM value calculator 716 enables a down counter 718 of the scheduler 202 and loads the down counter 718 with the FREM value. The FCLK signal is activated (if not already operative) and is used to clock the down counter 718. When the down counter 718 reaches zero or times out, it asserts a WAKEUP signal used to wake up the remaining circuitry of the scheduler 202 and the WOR circuitry 108.

The FTIME value 704 is used to establish the fine time frame and STIME is used for the coarse time frame for the duration of the sleep mode. As an example, assume FCLK has a frequency of 1 MHz and the FTIME value 704 is 1,000 for a sleep time of 1,000 μs. Also assume SCLK has a frequency of 32.768 kHz so that each SCLK cycle has a duration of about 30.518 μs. STIME is thus calculated as 1000/30.518 which is about 32.768 SCLK cycles. Since only integer values are used for timing purposes, the sleep time value 210 is programmed with STIME value of 32 so that WAKE is asserted after about 976 μs which is about 24 μs short of the goal of 1,000 μs. The FREM value calculator 716 uses the count value of the up counter 712 and the FTIME value 704 to calculate the FREM value representing the remaining number of FCLK cycles for the remaining sleep mode duration, and programs the down counter 718 for asserting WAKEUP accordingly.

Figure 8:
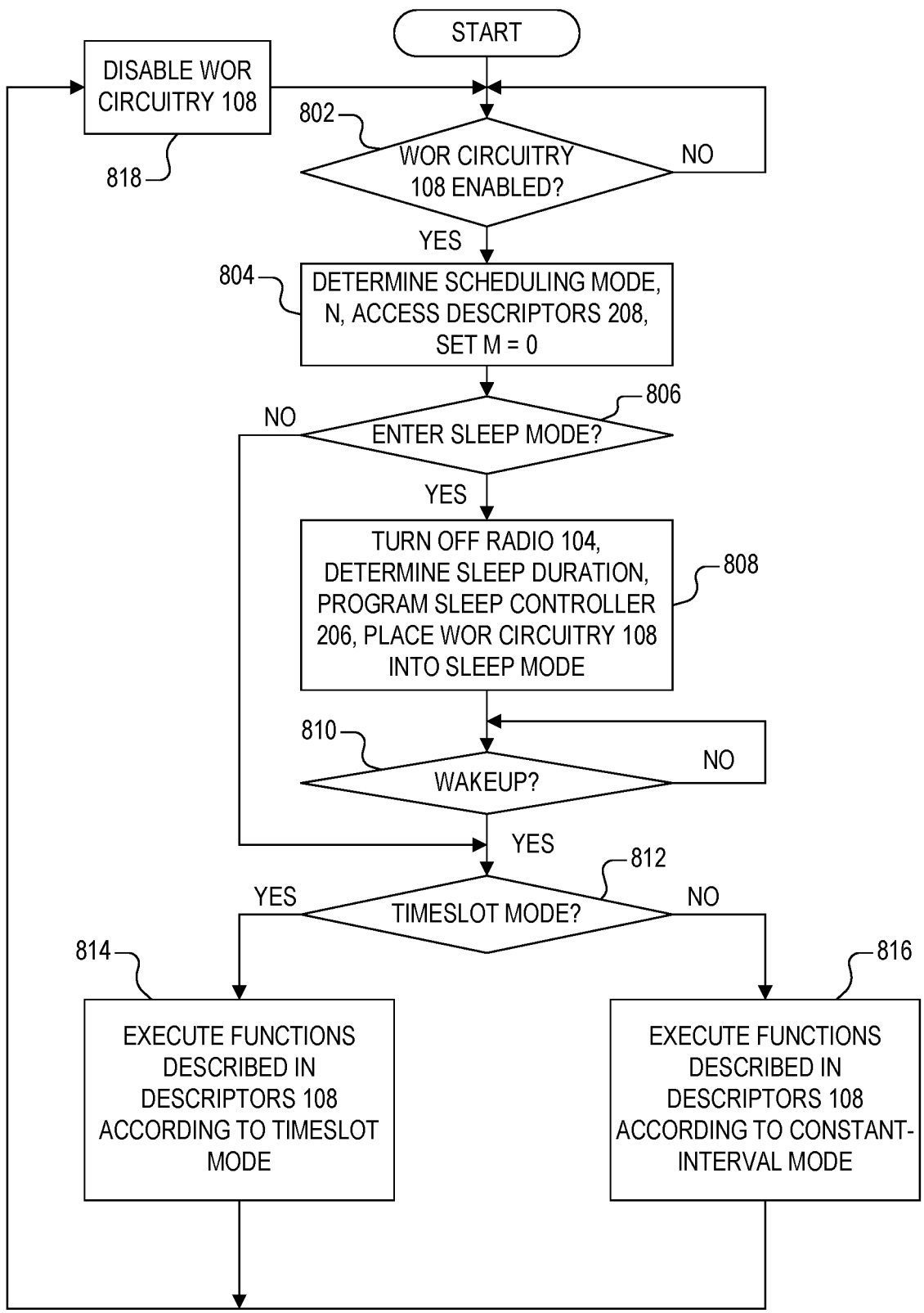
FIG. 8 is a flowchart diagram illustrating operation of the WOR circuitry of FIG. 1 according to one embodiment.

FIG. 8 is a flowchart diagram illustrating operation of the WOR circuitry 108 according to one embodiment. The WOR circuitry 108 is initially disabled or is otherwise in a wait mode or the like. The processor 116 programs the descriptors 208 and other parameters, such as a MODE value indicating the operative mode, the value N indicating the number of applicable slots of the descriptors 208, etc. Then the processor 116 activates or otherwise enables the WOR circuitry 108 to perform functions according to the selected mode of operation. A first block 802 is a loop representing the WOR circuitry 108 waiting to be enabled. Once enabled, operation advances to block 804 in which the WOR circuitry 108 reviews the MODE value or the like to determine the scheduling mode, access the descriptors 208, accesses other parameters such as N, and sets M=0 for the constant-interval mode. Operation then advances to next block 806 in which it is queried whether to enter the sleep mode. This determination is based on the descriptors 208 for determining the delay to the first operation in either mode. In most cases, the delay, and implied power savings, is sufficient to justify entering sleep mode.

Operation advances to block 808 to enter the sleep mode, in which the scheduler 202 turns off the radio 104 (if on), determines the sleep duration to the first slot or event, programs the sleep time value 210 of the sleep controller 206, and then places the WOR circuitry 108 into the sleep mode. The next block 810 represents a loop during sleep mode in which the scheduler 202 awaits assertion of the WAKEUP signal. When the WAKEUP signal is asserted, operation advances to a block 812 in which the scheduler 202 consults the MODE value to determine the selected scheduling mode. If timeslot mode, operation advances to block 814 to execute the functions described in the descriptors 108 according to the timeslot scheduling mode described further below. If constant-interval mode, operation advances instead to block 816 to execute the functions described in the descriptors 108 according to the constant-interval scheduling mode described further below. After completion of either of the scheduling modes, operation advances to block 818 in which the WOR circuitry 108 is disabled if not already disabled, and operation loops back to block 802 to await being re-enabled by the processor 116.

Figure 9:
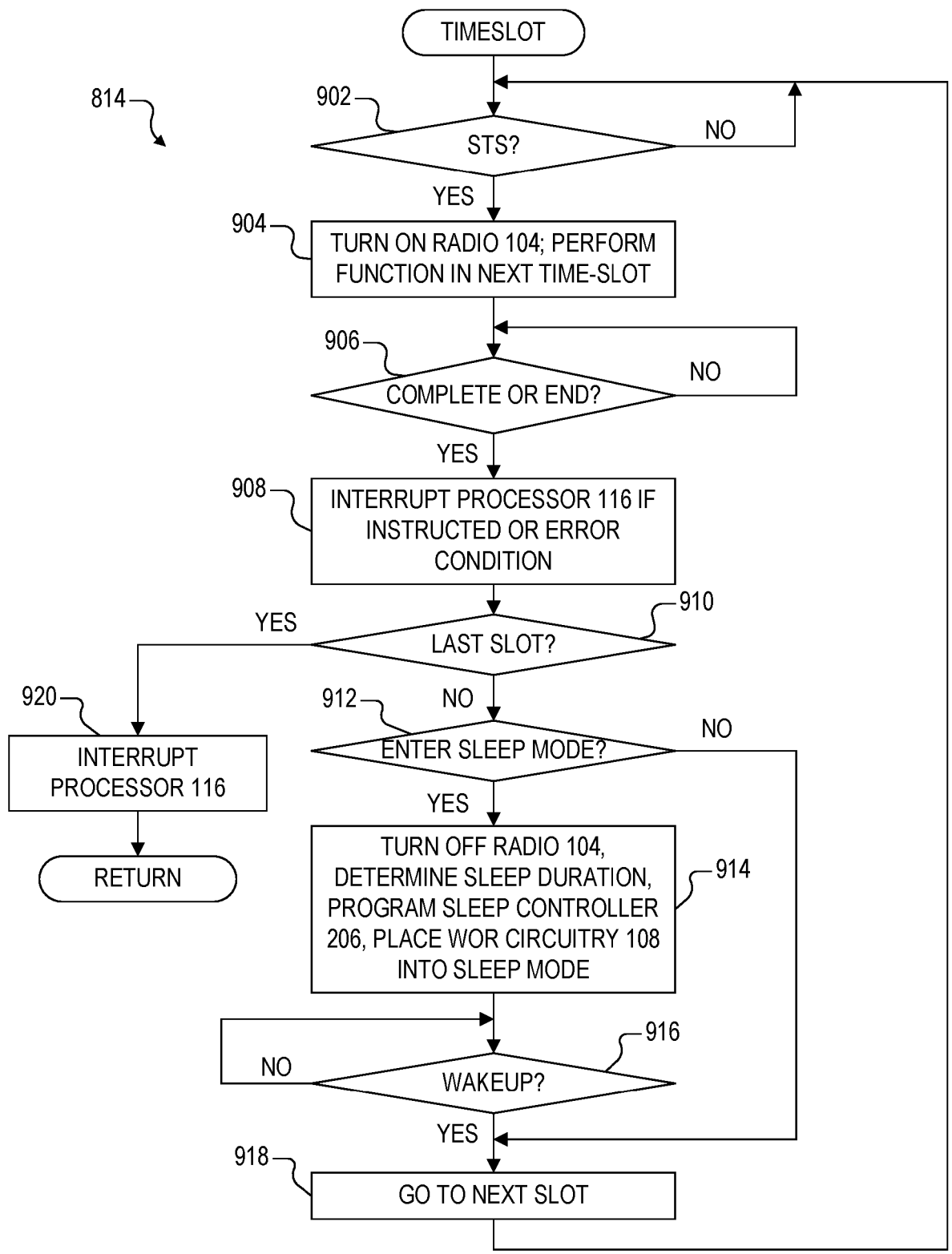
FIG. 9 is a flowchart diagram illustrating operation of the WOR circuitry of FIG. 1 during the timeslot mode according to one embodiment.

FIG. 9 is a flowchart diagram illustrating operation of the WOR circuitry 108 during the timeslot mode at block 814 according to one embodiment. At first block 902, it is queried whether the STS start time value is reached by the current time value of the event timer 404 as determined by the comparator 408 previously described in FIG. 4. When the event timer reaches STS, operation advances to block 904 in which the scheduler 202 turns on the radio 104 if not already on and performs the function in the first or next slot of the descriptors 208. The function is indicated by the function field 304 of the applicable slot. As previously described, the radio 104 performs the indicated function according to the protocol determined by the applicable LL engine of the link layer circuitry 114.

While the function is being executed, the scheduler 202 loops at block 906 until the function is completed or the END command is provided because of timeout in which case the function is aborted. Operation then advances to block 908 in which the scheduler 202 interrupts the processor 116 if instructed to do so according to the values in the fields 308 and 310 of the applicable slot of the descriptors 208, or upon any error condition that may occur. Operation then proceeds to block 910 in which it is queried whether the last slot of the descriptors 208 has been performed. If not, operation advances to block 912 to query whether to enter the sleep mode which may be determined, for example, by the sleep field 306 of the applicable slot. If sleep mode is commanded, then operation advances to next block 914 in which the scheduler 202 turns off the radio 104, determines the sleep duration and programs the sleep controller 206 as previously described, and then places the WOR circuitry 108 into the sleep mode. Operation loops at next block 916 during sleep mode until the WAKEUP signal is asserted. When asserted, operation advances to next block 918 in which the scheduler 202 advances to the next slot of the descriptors 208, and operation then loops back to block 902 to wait until the next start time of the next slot is reached as indicated by STS. Referring back to block 912, if sleep mode is not indicated, then operation advances directly to block 918 to advance to the next slot of the descriptors 208.

Operation loops between blocks 902 to 918 during timeslot scheduling mode to perform the indicated function for each of the N slots until the last slot is reached as determined at block 910. After the function of the last slot is performed, operation advances instead to block 920 in which the scheduler 202 interrupts the processor 116 for re-programming the descriptors 208, if desired. Operation then returns back to block 818 to disable the WOR circuitry 108 and then to block 802 to await being re-enabled.

Figure 10:
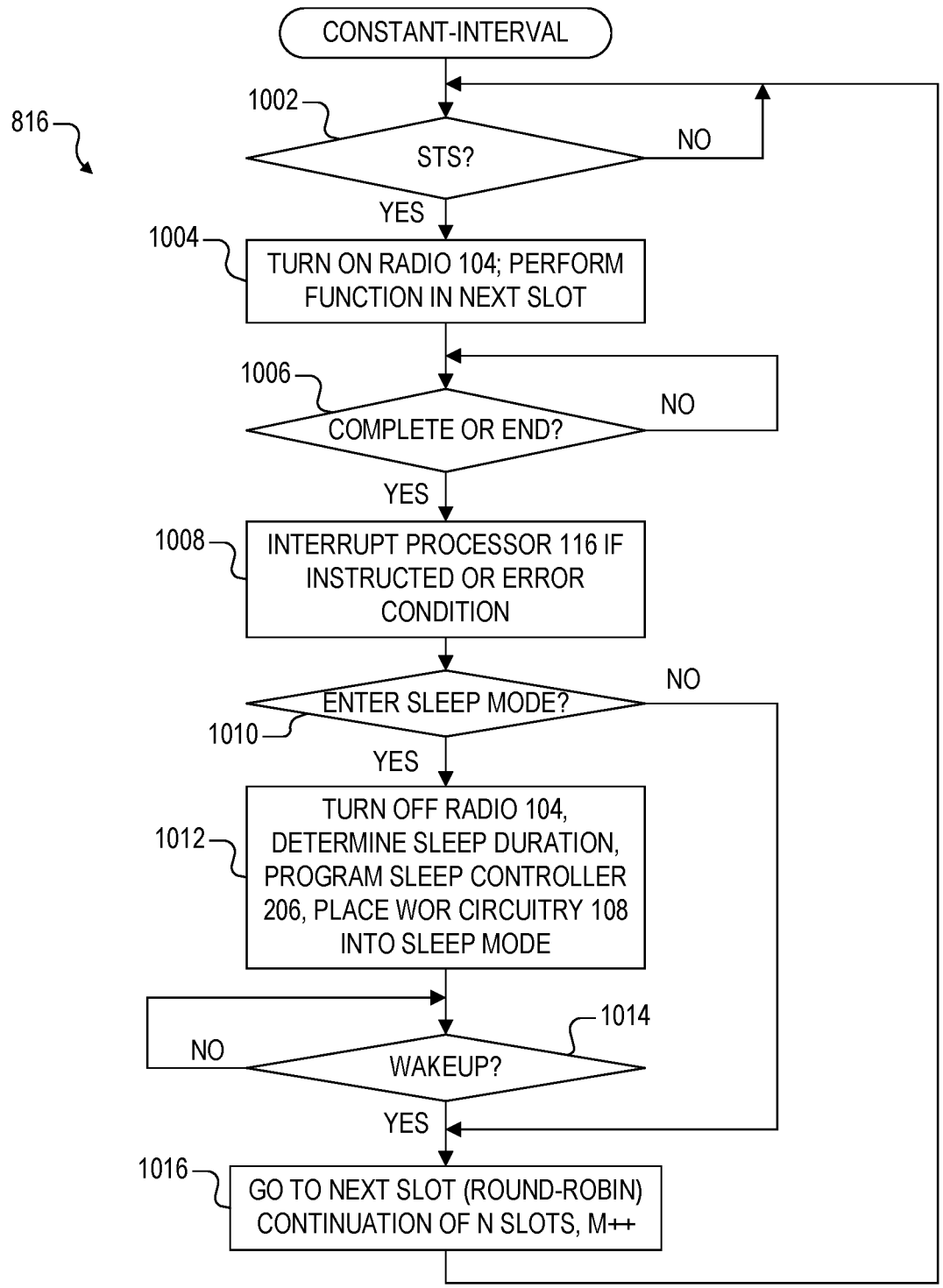
FIG. 10 is a flowchart diagram illustrating operation of the WOR circuitry of FIG. 1 during the constant-interval mode according to one embodiment.

FIG. 10 is a flowchart diagram illustrating operation of the WOR circuitry 108 during the constant-interval mode at block 816 according to one embodiment. At first block 1002, it is queried whether the start time and indicated by STS based on START, INTERVAL and M as previously described. When the applicable timing condition is reached, operation advances to block in which the scheduler 202 turns on the radio 104 if not already on and performs the function in the first or next slot of the descriptors 208. While the function is being executed, the scheduler 202 loops at block 1006 until the function is complete or a timeout occurs based on WINDOW timing in which case the END command is provided and the function is aborted. Operation then advances to block 1008 in which the scheduler 202 interrupts the processor 116 if instructed to do so according to the values in the fields 308 and 310 of the applicable slot of the descriptors 208, or upon any error condition that may occur.

Operation then proceeds to block 1010 to query whether to enter the sleep mode which may be determined, for example, by the sleep field 306 of the applicable slot. If sleep mode is commanded, then operation advances to next block 1012 in which the scheduler 202 turns off the radio 104, determines the sleep duration and programs the sleep controller 206 as previously described, and then places the WOR circuitry 108 into the sleep mode. Operation loops at next block 1014 during sleep mode until the WAKEUP signal is asserted. When asserted, operation advances to next block 1016 in which the scheduler 202 advances to the next slot of the descriptors 208, and operation then loops back to block 1002 to wait until the INTERVAL time expires. Also, the integer value M is incremented by 1 as indicated by "M++" for the next interval. Referring back to block 1010, if sleep mode is not indicated, then operation advances directly to block 1016 to advance to the next slot of the descriptors 208 and increment M.

During the constant-interval scheduling mode according to one embodiment, operation loops between blocks 1002 and 1016 while looping between the slots of the descriptors 208 in round-robin fashion indefinitely until interrupted or otherwise terminated by the processor 116. When terminated by the processor 116, operation then returns back to block 818 to disable the WOR circuitry 108 and then to block 802 to await being re-enabled.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:
1. A wireless communication system, comprising:
a radio;
a processing circuit including a processor; and
wake on radio circuitry that uses programmed descriptors to autonomously schedule transitioning into and out of sleep mode to periodically awaken and turn on the radio and perform at least one radio frequency deterministic function while the processor remains in a low power state,
wherein the programmed descriptors are programmed according to a timeslot mode comprising a plurality of slots in which each slot includes a corresponding one of a plurality of start times and a corresponding one of a plurality of deterministic functions,
wherein the wake on radio circuitry comprises a scheduler that invokes protocol circuitry of the radio to perform each of the deterministic functions beginning at a corresponding one of the plurality of start times within a slot-frame,
wherein each of the plurality of slots of the programmed descriptors includes at least one value selected from a group consisting of:
a complete value that determines whether the scheduler awakens the processor upon completion of a corresponding deterministic function, a timeout value that determines whether the scheduler awakens the processor in the event of a timeout while performing a corresponding deterministic function, and a sleep value that determines whether the scheduler schedules the sleep mode after completion of a corresponding deterministic function.

2. The wireless communication system of claim 1, wherein the programmed descriptors are programmed according to a selected one of a plurality of different scheduling modes in which each of the plurality of different scheduling modes are supported by a plurality of different protocols.

3. The wireless communication system of claim 2, wherein the plurality of different scheduling modes includes the timeslot mode and a constant-interval mode.

4. The wireless communication system of claim 1, wherein the at least one value includes the complete value.

5. The wireless communication system of claim 1, wherein the at least one value includes the timeout value.

6. The wireless communication system of claim 1, wherein the at least one value includes the sleep value.

7. The wireless communication system of claim 1, wherein the programmed descriptors are programmed according to a constant-interval mode comprising a start value indicating a start time of a first event of a plurality of events, an interval value indicating a duration between the plurality of events, and a window value indicating a duration of each of the plurality of events.

8. The wireless communication system of claim 7, wherein the programmed descriptors comprises a plurality of deterministic functions, and wherein the wake on radio circuitry comprises a scheduler that awakens the wake on radio circuitry for each of the plurality of events to perform a next one of the deterministic functions in round-robin fashion and that places the wake on radio circuitry upon completion of each event.

9. The wireless communication system of claim 1, wherein the wake on radio circuitry comprises:

a sleep controller that remains powered during the low power state to provide a wake signal to awaken the wake on radio circuitry upon timeout of a sleep duration based on a sleep time value; and a scheduler that programs the sleep time value and that places the wake on radio circuitry into the sleep mode.

10. The wireless communication system of claim 9, wherein the wake on radio circuitry operates using a first clock signal and wherein the sleep controller operates using a second clock signal having a significantly lower frequency level than the first clock signal, and wherein the scheduler comprises calculation circuitry that uses the programmed descriptors to determine a sleep duration based on a frequency of the first clock signal, that determines the sleep time value based on a frequency of the second clock signal, and that determines a remainder value indicative of a remaining sleep duration after the sleep controller provides the wake signal.

11. The wireless communication system of claim 1, wherein the at least one radio frequency deterministic function comprises at least one of a receive function and a transmit function.

12. The wireless communication system of claim 1, wherein the at least one radio frequency deterministic function comprises a receive function followed by a transmit function or a transmit function followed by a receive function.

13. The wireless communication system of claim 1, wherein the wake on radio circuitry comprises window widening circuitry determines and updates a window widening value that both advances and retards a specified communication window for a receive function.

14. The wireless transceiver of claim 13, wherein the window widening value is increased over time for successive receive functions.

15. A method of reducing power consumption of a wireless communication system which includes a radio and a processor, the method comprising:

programming a plurality of programmable descriptors according to a timeslot mode comprising a plurality of slots in which each slot includes a corresponding one of a plurality of start times and a corresponding one of a plurality of deterministic functions; and providing wake on radio circuitry that uses the descriptors to autonomously schedule transitioning into and out of sleep mode to periodically awaken and turn on the radio and perform at least one radio frequency deterministic function while the processor remains in a low power state, wherein the wake on radio circuitry comprises a scheduler that invokes protocol circuitry of the radio to perform each of the deterministic functions beginning at a corresponding one of the plurality of start times within a slot-frame, wherein each of the plurality of slots of the programmed descriptors includes at least one value selected from a group consisting of:

a complete value that determines whether the scheduler awakens the processor upon completion of a corresponding deterministic function, a timeout value that determines whether the scheduler awakens the processor in the event of a timeout while performing a corresponding deterministic function, and a sleep value that determines whether the scheduler schedules the sleep mode after completion of a corresponding deterministic function.

16. The method of claim 15, wherein the timeslot mode is supported by a plurality of different link layer communication protocols.

17. The method of claim 15, wherein the programming comprises programming a plurality of deterministic functions, a start value, an interval value, and a window value for operating in a constant-interval mode.

18. The method of claim 15, wherein the at least one value includes the complete value.

19. The method of claim 15, wherein the at least one value includes the timeout value.

20. The method of claim 15, wherein the at least one value includes the sleep value.

* * * * *